March 1, 1960 R. J. ANDERSON 2,926,596
AUTOMATIC TOASTER
Filed Nov. 12, 1954 3 Sheets-Sheet 3
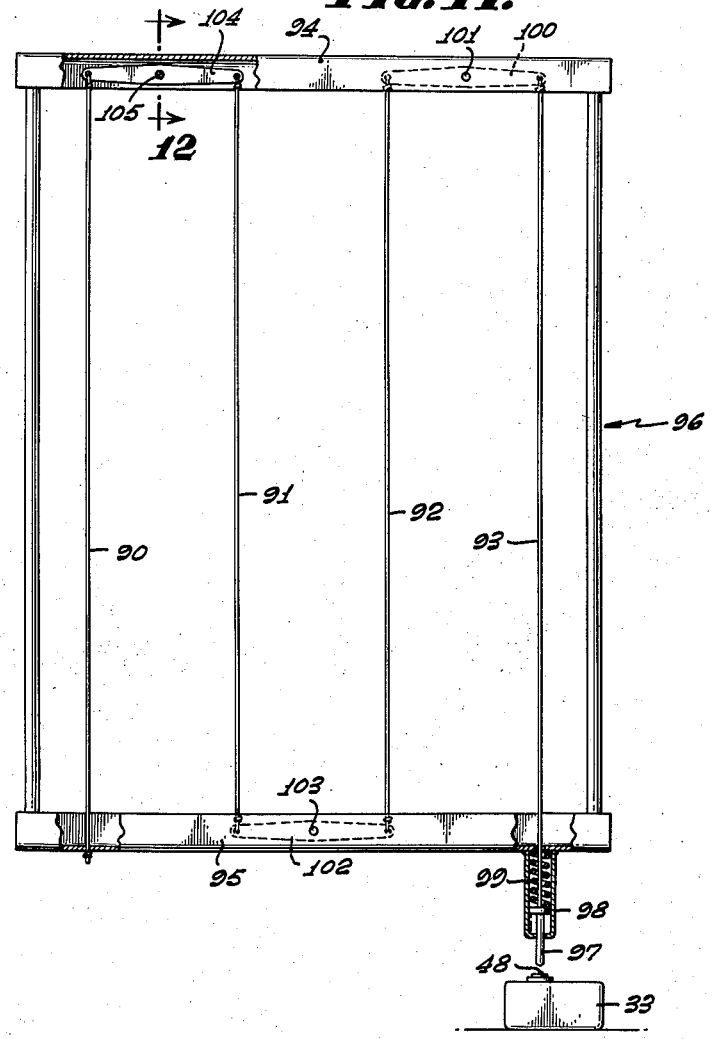
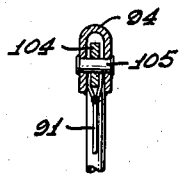
INVENTOR.
Roy J. Anderson
BY
Bernard Kriegel
ATTORNEY.

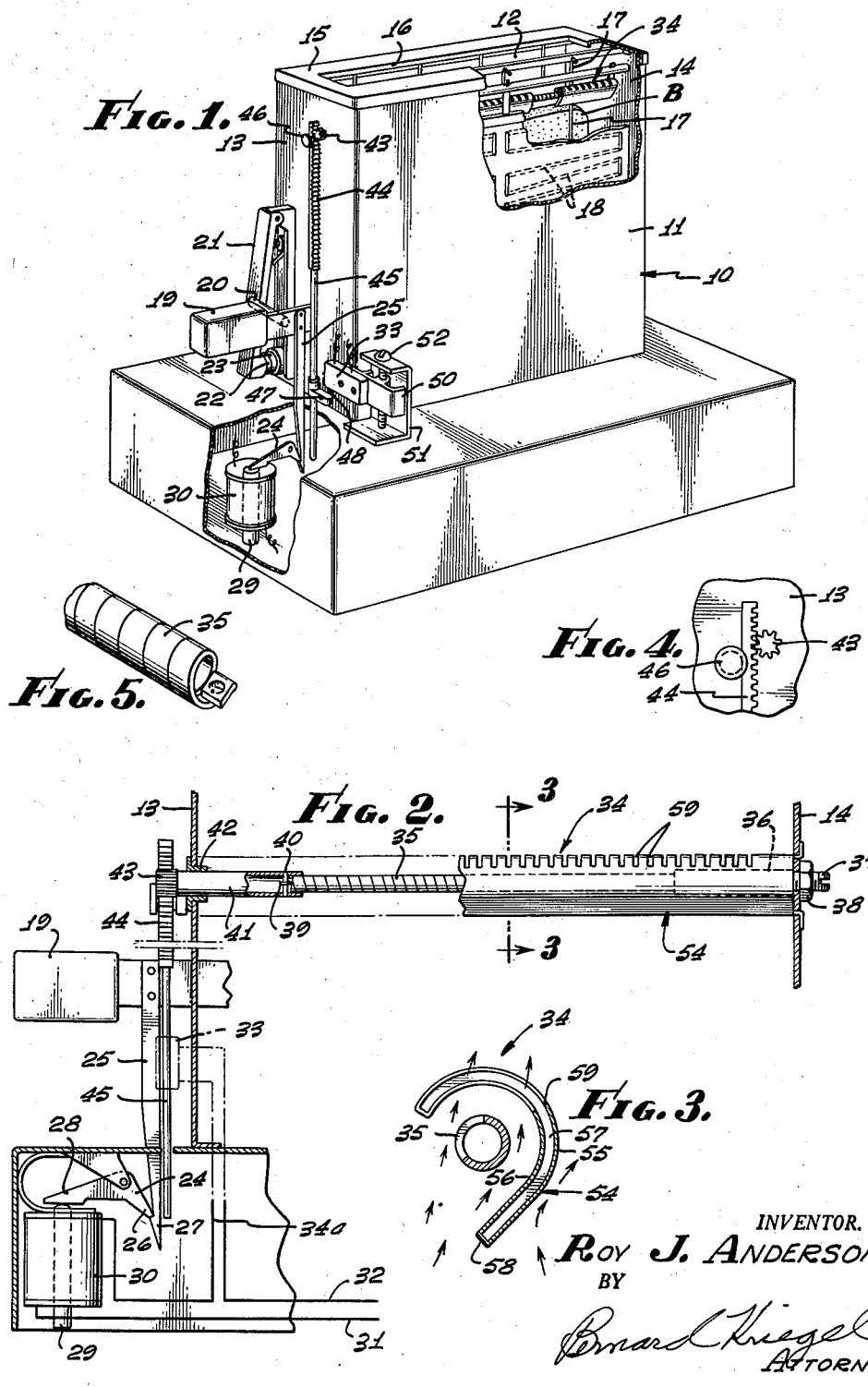
March 1, 1960 R. J. ANDERSON 2,926,596
AUTOMATIC TOASTER
Filed Nov. 12, 1954 3 Sheets-Sheet 1
INVENTOR.
Roy J. Anderson
BY
Bernard Kriegel
ATTORNEY.

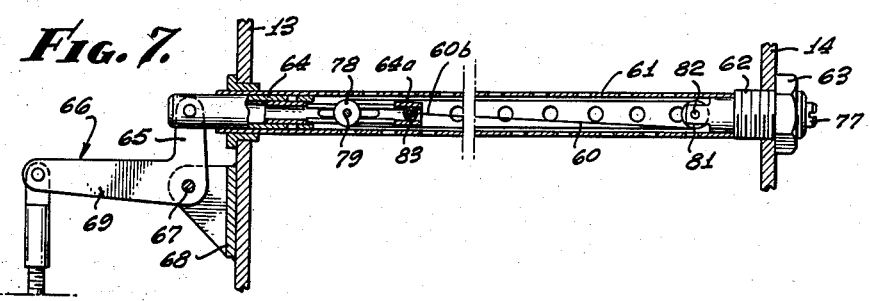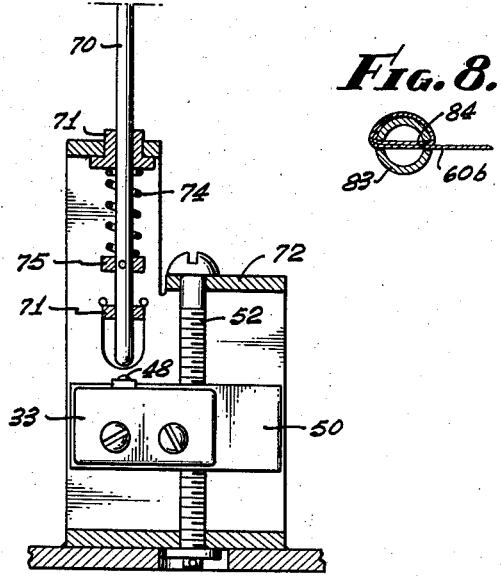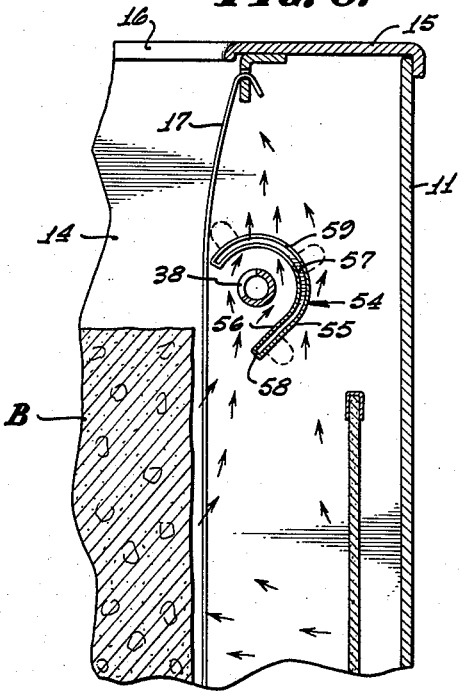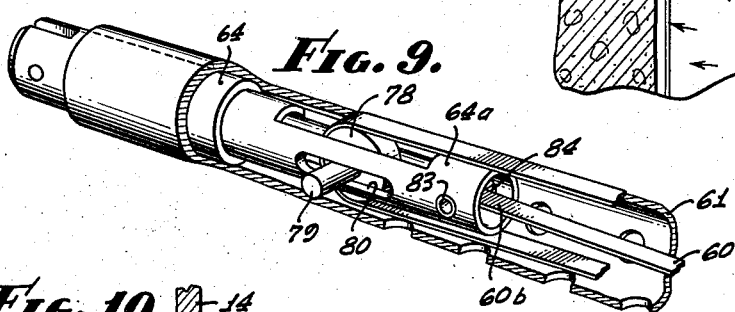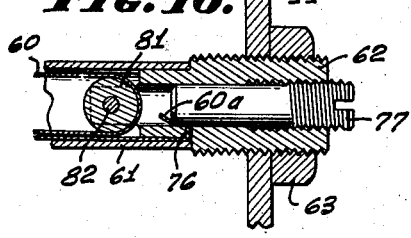

United States Patent Office 2,926,596
Patented Mar. 1, 1960

2,926,596

AUTOMATIC TOASTER

Roy J. Anderson, Los Angeles, Calif.

Application November 12, 1954, Serial No. 468,305

8 Claims. (Cl. 99—331)

The present invention relates to toaster apparatus, and more particularly to automatically operated apparatus for toasting bread and similar food products.

Automatic bread toasters usually rely upon a timer device for determining the duration of heat application to the bread slice. The degree of toasting of the bread slice varies, depending upon the condition of the bread when placed in the toaster, oftentimes resulting in the bread being toasted to an insufficient extent or to too great a degree from the actual result desired.

An object of the present invention is to provide an improved automatic bread toaster capable of toasting bread slices to the desired extent, regardless of the initial condition of the bread.

Another object of the invention is to provide an automatic bread toaster, in which the bread, or similar food product, in the toaster is instrumental in discontinuing the application of heat to the bread upon the latter reaching the preselected and desired toasted condition.

A further object of the invention is to provide an automatic bread toaster in which the heat emanating from the bread being toasted is instrumental in procuring discontinuance of heat application to the bread when it reaches the desired toasted condition.

Yet another object of the invention is to provide an automatic bread toaster operable in response to the heat emanating from the bread in the toaster itself, which is sensitive in its operation, and in which the degree of toasting of the bread can be varied easily.

Still a further object of the invention is to provide an automatic toaster having a thermally responsive control device for determining the duration of heat application to the food product in the toaster, in which the control device has a relatively large range of mechanical movement during its operation, enabling it to positively and accurately actuate mechanism controlling the toaster.

Another object of the invention is to provide an automatic bread toaster having a thermally responsive control device possessing relatively small heat inertia or retentivity, enabling it to respond quickly to changes in temperature in the toaster. In other words, the control device is capable of absorbing heat quickly and losing heat quickly during the periods of heating and cooling of the toaster. Because of this characteristic, the toaster can repeatedly toast bread to a uniform consistency, with very little time interval between withdrawal of a toasted bread slice and insertion of an untoasted slice.

In its general aspects, the invention contemplates the utilization of the heat emanating from the slice of bread in the toaster for controlling the application of heat to the bread. The heat applied from the source to the bread is incapable, by itself, of causing the particular thermally responsive device being employed to operate the control mechanism in the toaster to effect discontinuance of the application of heat to the bread. But as the toasting of the bread continues, the heat emanating therefrom eventually raises the temperature of the thermally responsive device to the proper extent, causing sufficient movement of the thermally responsive device as to effect a discontinuance of heat application to the slice of bread in the toaster.

In a more limited sense, the thermally responsive control device is shielded from the source of heat, but is subject to the heat emanating from the bread slice. As the toasting operation commences and the slice of bread heated, the thermally responsive element is subjected to the heat of the air in the toaster and the vapors arising from the bread, which will increase its temperature. However, such rise in temperature is insufficient to cause the thermally responsive device to effect actuation of the mechanism that will discontinue the application of heat to the bread. In addition to such temperature in the toaster, the thermally responsive device is also being subjected to radiation from the face of the bread itself, and when the slice of bread itself has been colored to the proper brown shade, it will be radiating sufficient heat to the thermally responsive device, which, when coupled with the heat rising in the toaster itself and acting on the thermally responsive device, will increase the temperature of the latter to the desired extent. In other words, the temperature of the thermally responsive device will only be increased to the predetermined maximum value at which heat application to the toast will be discontinued when the bread has been toasted to the desired extent.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an isometric projection of a toaster embodying the invention, with parts being broken away to disclose portions of the interior of the toaster;

Fig. 2 is a section, on an enlarged scale, through the temperature responsive control portion of the apparatus shown in Fig. 1;

Fig. 3 is an enlarged transverse section of the thermally responsive element and shield, taken along the line 3—3 on Fig. 2;

Fig. 4 is an enlarged fragmentary side elevation of the rack and pinion portion of the control mechanism shown in Fig. 1;

Fig. 5 is an isometric projection of a portion of the bimetallic helical thermally responsive element embodied in the toaster;

Fig. 6 is an enlarged fragmentary cross-section through the upper portion of the toaster disclosed in Fig. 1;

Fig. 7 is a view similar to Fig. 2, disclosing another embodiment of thermally responsive control mechanisms;

Fig. 8 is an enlarged cross-section showing the mode of attaching one end of the thermally responsive metallic ribbon disclosed in Fig. 7;

Fig. 9 is an isometric projection on an enlarged scale, with part in section, through a portion of the thermally responsive control device disclosed in Fig. 7;

Fig. 10 is an enlarged fragmentary longitudinal section through another portion of the thermally responsive control device disclosed in Fig. 7;

Fig. 11 is a front elevation, with parts broken away, through yet another form of thermally responsive control device adapted to be incorporated in a bread toaster;

Fig. 12 is an enlarged cross-section taken along the line 12—12 on Fig. 11.

In the form of invention disclosed in Figs. 1 to 6, inclusive, an automatic bread toasting apparatus is disclosed, in which a frame or housing 10 has side and end walls 11, 12, 13, 14 and a top portion 15 provided with an opening 16 through which a slice of bread B may be dropped. Although a single slice toaster is disclosed, it will be apparent that the invention is applicable to multiple slice toasters.

The toaster will include the usual vertical, spaced bread wires 17, suitably secured to the frame of the toaster in a known manner, for holding the bread in a substantially vertical position in the toaster. These bread wires are normally located closely adjacent the sides of the bread, and prevent the latter from engaging the electrical resistance heating elements 18 that are disposed on opposite sides of the bread slice B in the usual manner. These resistance or heating elements 18 are preferably of the open type, rather than being enclosed in sheets of mica, to enable the resistance elements to heat quickly when current is passed therethrough, and also to cool relatively quickly when the circuit therethrough is disrupted. When current is passing through the heating elements 18 on opposite sides of the slice of bread B, the heat emanating therefrom will, by radiation and by convection, perform a heating and toasting action upon the slice of bread, the bread absorbing heat, any moisture in the bread being caused to rise in the toaster as hot vapor, until all the moisture is driven off, after which the bread will begin to brown. When it has browned to the desired extent, it is desired to interrupt the circuit to the heating elements 18, and cause the bread to rise up through the opening 16 in the toaster, to permit its removal.

The bread slice B is lowered in the toaster and the circuit to the heating elements completed by depressing a hand lever 19 extending outwardly of the housing enclosure 10. The mechanism for lowering the bread slice forms no part of the present invention and can assume any known or conventional form. Similarly, when the circuit to the heating element is disrupted, as explained hereinafter, the toaster includes devices (not shown) which will cause the hand lever 19 and the bread slice to rise, all in a known manner.

When the hand lever 19 is depressed, a rod 20 extending laterally therefrom will engage a movable switch arm 21 and move it inwardly toward the housing, causing a movable contact 22 on such an arm to engage a stationary switch contact 23, for the purpose of completing the circuit to the heating elements 18 and initiating the toasting operation. Upon the depression of the hand lever 19 to the required extent, it is latched in such position by a latch lever 24 pivotally mounted in the housing engaging a depending latch leg 25 secured to the hand lever 19. One detent arm 26 of this latch lever engages a tooth 27 on the latch leg, and the opposite arm 28 of this lever bears against a plunger 29 extending through a solenoid coil 30. By virtue of the arrangement described, the latch lever 24 operates as a holding member securing the hand lever 19 in its downward position, to allow the bread slice B to remain fully within the toaster and to hold the main switch contacts 22, 23 closed. When current is allowed to pass through the solenoid coil 30, its plunger 29 will be pulled upwardly, to swing the latch lever 24 in a clockwise direction, as seen in Fig. 2, removing its holding arm 26 from the tooth 27 of the latch leg 25, which then allows the hand lever 19 to move upwardly to project the slice of toast B through the upper opening 16 in the toaster and to also allow the main switch 22, 23 to open, which it will inherently tend to do by virtue of a suitable spring (not shown), or the like, tending to urge it outwardly of the toaster housing.

The passage of current through the solenoid coil 30, for the purpose of tripping the latch lever 24 and the main switch 22, 23 depends upon the completion of a circuit through the solenoid coil. This circuit includes a pair of conductive lines 31, 32 running from a suitable source of current, one of the lines 31 being connected to one end of the solenoid coil 30, the other line 32 being connected to a microswitch 33. A conductive lead 34a runs from the microswitch to the other end of the solenoid coil 30. When the microswitch 33 is closed, the circuit through the solenoid coil 30 is completed.

The closing of the microswitch 33 is dependent upon the movement of a thermally responsive device 34 in the toaster itself, located between one of the heating elements 18 and the face of the bread slice B, and preferably immediately above the slice of bread. As specifically disclosed in Figs. 1 to 6, inclusive, this thermally responsive apparatus 34 includes a helical bimetallic element 35, that is preferably very thin, one end of this bimetallic element being secured to a stationary tubular member 36 having a threaded end 37 extending through an end wall 14 of the housing, this stationary member being attached to the housing in appropriate position, as by means of a nut 38 threaded thereon and bearing against the end wall 14. The helical bimetallic element 35 extends parallel to the bread slice B and heating elements 18 toward the other end wall 13 near which its terminal 39 is secured to a transverse pin 40 attached to a tubular pinion shaft 41 extending through a bearing 42 mounted in the other end wall 13.

Externally of the end wall 13, the pinion shaft 41 has a pinion 43 attached to it meshing with a rack 44 integral with, or secured to, a rod 45 extending downwardly toward the base of the toaster. The rack 44 is held in mesh with the pinion 43 by a headed pin 46 secured to the end wall 13 and engaging the rear face of the rack. The rod itself has an arm 47 secured thereto adapted to engage the plunger or operating button 48 of the microswitch 33.

As the helical bimetallic element 35 increases in temperature, it will tend to unwind and, in so doing, will rotate the pinion shaft 41 and pinion 43 in a direction to elevate the rack 44, causing the arm 47 on the rod 45 to engage the microswitch 33 and close the latter, completing the circuit through the solenoid 30. Of course, upon cooling of the helical bimetallic element 35, it will rotate in the opposite direction, causing the rack 44 to descend, allowing the arm 47 to move away from the microswitch plunger 48, whereupon the microswitch 33 will shift to an open condition.

The microswitch 33 can be secured to a support 50 that extends within a bracket 51 suitably mounted on the base portion of the toaster frame 10. This bracket has an adjusting screw 52 rotatably mounted therein and threaded through the support 50. Rotation of the screw 52 in one direction or the other will raise or lower the microswitch 33, requiring a greater or lesser movement of the rack 44 to complete the circuit through the solenoid 30, effecting tripping of the toaster mechanism and opening of the circuit through its heating elements 18. Elevation of the microswitch 33 requires a greater rise in temperature of the bimetallic element 35 to trip the toaster, and will, accordingly, result in a greater final toasting of the bread slice B. Conversely, lowering of the microswitch 33 by rotation of the adjusting screw 52 will cause the apparatus to be tripped when the toast has achieved a lighter condition.

The helical bimetallic and very thin element 35 is shielded from the direct heating action of the heating elements 18 by a generally U-shaped shield 54 interposed between the helical bimetallic control element 35 and a heating element 12. This shield 54 is made with a double wall 55, 56 to provide an insulating air space 57 therebetween to prevent the heat in the outer wall 55 from being conveyed to the thermally responsive helical element 35. The shield 54 extends along the entire length of the toaster between the end walls 13, 14, being suitably secured to the latter as by extending tabs 56 integral with the shield through holes 57 in the end walls, and bending them in an outward direction against the exterior of the end walls 13, 14.

The lower end 58 of the shield 54 is spaced outwardly from the bread slice B and the bread wires 17 themselves, to permit air in the toaster and vapors emanating from the bread slice to rise in the toaster, and to act upon the bimetallic element 35 contained within the shield. Such air and vapors are allowed to pass through the upper portion of the shield by perforating it, as through the provision of relatively uniformly spaced transverse slots 59 therein. Thus, the air and vapors can have relatively free passage upwardly around the thermally responsive element 35 and through the upper slotted portion of the shield, then passing outwardly through the opening 16 in the toaster. However, it is evident that the heating element 18 cannot radiate any heat to the bimetallic element 35, inasmuch as the shield 54 prevents such action from occurring.

Assuming that the adjusting screw 52 has been turned to place the microswitch 33 in the position to secure the desired toasted bread condition, a slice of bread B is dropped into the upper slot 16 of the toaster and the hand lever 19 depressed, to close the main switch 22, 23 and circuit through the heating element 18 and to lower the bread slice completely within the toaster. The hand lever 19 is locked in its lower position by virtue of the detent 26 on the latch lever 24 engaging the tooth 27 on the latch leg 25. Current passing through the heating elements 18 will cause the toasting operation to commence, the heat being radiated to the slice of toast and also warming the air in the toaster. The bimetallic element 35 is being heated by the rising air and, as the temperature of the bread is increased sufficiently, water vapor will rise upwardly therefrom to add its heat to the thermally responsive element 35, which has a comparatively great total length and which will progressively uncoil as its temperature rises, rotating the pinion 43 and elevating the rack 44. When all of the moisture has been removed from the bread slice B, its surfaces will begin to brown. As such browning action occurs, the bread is radiating heat to the thermally responsive element 35 to a greater extent. When the proper degree of browning has occurred, sufficient heat will have been radiated to the thermosatic element 35 to increase its temperature and effect uncoiling to the extent in which the rack 44 has been elevated sufficiently to cause the rod arm 47 to engage the microswitch plunger 48 and close the microswitch 33. With the microswitch closed, the circuit through the solenoid 30 is completed, causing its plunger 29 to be drawn upwardly, shifting the latch lever detent 26 outwardly away from the latch leg tooth 27, thereby removing restraint to upward movement of the hand lever 19. The lever 19 then moves upwardly to effect elevation of the toasted slice B and opening of the main switch 22, 23 controlling the circuit through the heating elements 18, which, of course, will then commence cooling. The bimetallic element 35, being made of very thin metal and having a comparatively large length, will cool and contract to cause the pinion shaft 41 and pinion 43 to rotate in the opposite direction and shift the rack 44 downwardly, effecting the opening of the microswitch and the circuit to the solenoid coil 30.

With the apparatus described, the thermally responsive element 35 is incapable of partaking of sufficient movement, due to the temperature of the air in the toaster itself, to effect a tripping of the toaster and the opening of the circuit through the heating elements 18. It takes the additional amount of heat radiating and otherwise emanating from the slice of bread when it secures the desired degree of browning, to elevate its temperature enough to secure the additional rotation of the pinion 43, movement of the rack 44, and the completion of the circuit through the solenoid coil 30 to effect the tripping of the toaster mechanism, to open the circuit through the heating coils 18, and to secure the elevation of the toast B through the upper opening 16. Until such degree of brownness or color in the toast is secured, as determined by the positioning of the microswitch 33 with respect to the rod actuating arm 47, current will continue to pass through the heating elements 18 and the toasting action continuing.

Accordingly, it is evident that it is the condition of the bread itself which will determine whether the application of heat to the heating elements 18 is to be discontinued. Reliance need not be had upon any timing mechanisms, with their attendant inaccuracies, particularly since such timing mechanisms cannot, by themselves, compensate for varying initial conditions of bread as it is placed in the toaster.

A modified form of thermally responsive control apparatus for closing the microswitch 33 is disclosed in Figs. 7 to 10, inclusive. A relatively thin metallic ribbon 60, preferably having a high coefficient of expansion and contraction, is disposed within a perforated tubular shield 61 extending lengthwise of the toaster between its end walls 13, 14. The shield 61 occupies essentially the same position in the toaster as the generally U-shaped shield 54 of the other form of the invention, one end of the shield extending through the forward end wall 13, the other end of the shield being attached to a plug 62 threaded through the other end wall 14, the plug being secured in position by a suitable clamp nut 63 threaded thereon and bearing against the exterior of the end support or wall 14.

Longitudinally movable within the perforated tube or shield 61 is an operating or actuating head 64, the outer end of which is pin connected to one arm 65 of a bell crank lever 66 oscillatable upon a fulcrum pin 67 secured to a bracket 68 suitably attached to the forward end wall 13. The other arm 69 of the lever is pin connected to the upper end of a switch operating rod 70 extending through spaced bearings 71 in a support 72 attached to the base portion of the frame 10. The lower end of the rod 70 is in alignment with the operating plunger or button 48 of the microswitch 33, which is adjustably mounted on the adjusting screw 52 that is rotatable in the bracket or support 72. The pin connection between the bell crank lever arm 69 and the upper end of the rod 70 may be rather loose, to permit the bell crank 67 to oscillate and yet allow straight line movement of the switch operating rod 70 to occur.

The switch operating rod 70 is urged in a downward direction toward a position engaging the plunger 48 and closing the microswitch 33 by a helical compression spring 74 encircling the rod, its upper end engaging the upper bearing 71 and its lower end engaging a suitable spring seat 75 attached to the rod itself. The ability of this spring 74 to shift the rod 70 in a downward direction, to close the microswitch, depends upon the temperature of the flat metallic ribbon 60 contained within the shield 61.

To secure a greater extent of mechanical movement of the switch operating elements, a relatively long ribbon 60 is provided which is still contained within the relatively small space and confines of the tubular shield 61. To secure the proper length of metallic ribbon, one of its ends 60a is secured at the rear end wall 14 of the toaster. Thus, the end of this ribbon passes between the end of the tubular shield 61 and then through a transverse slot 76 in the threaded plug 62 to the interior of the latter. The end 60a of the ribbon is prevented from being pulled through this slot 76 by a clamp screw 77 threaded into the plug 62 and disposed across the slot 76 in engagement with the inner end of the ribbon.

From the rear end wall 14, the ribbon extends along the length of the tube 61, passing over a pulley 78 at the forward end of the shield 61, which is rotatably mounted on a shaft 79 extending diametrically across and secured to the shield 61. The shaft 79 extends through longitudinal slots 80 in an inner extension 64a of the actuating head 64, so that the shaft does not interfere with longitudinal movement of the actuating head 64 in the shield 61. From the pulley 78, the thin metallic ribbon 60 extends within the tube 61 toward the rear end of the latter, passing over a rear pulley 81 that is rotatably mounted on a shaft 82 which also extends diametrically across and is secured to the perforated shield 61 itself. The ribbon 60 then passes back toward the actuating head 64, being secured to a transverse tube 83 extending across the latter, the securing action occurring in any suitable manner, as by passing it through a slot 84 in the tube and thence around the tube itself and back into the slot 84.

The metallic ribbon 60 is maintained in a taut or tightened condition at all times by the helical spring 74, which tends to depress the switch operating rod 70 and, through the bell crank lever 66, urges the actuating head 64 in a direction outwardly of the toaster housing. Such outward movement exerts a pull upon the end 60b of the metallic thermally responsive ribbon 60 secured to the head, urging such end toward the forward end wall 13. The rear end 60a of the ribbon is incapable of moving, since it is secured to the rear threaded plug 62 and the pulley shafts 79, 81 themselves are prevented from moving by virtue of being secured to the shield 61. As a result, the metallic ribbon 60 is held in tightened condition in the same manner as if it were a belt passing around the pulleys 78, 81.

As the temperature of the metallic ribbon 60 rises, it expands and allows the spring 74 to shift the rod 70 in a downward direction. When the temperature rises to a sufficient extent, the rod 80 engages the plunger 48 and closes the microswitch 33, securing the tripping of the toaster in the same manner as was described in connection with the other embodiment of the invention.

As in the other embodiment of the invention described above, the heat radiating directly from the heating elements 18 has very little effect upon the ribbon 60, since it is incapable of passing directly thereto. In this form of the invention, some slight radiation effects might be imparted to the ribbon in view of the perforations in the tubular member 61, but the tubular member can be made imperforate along that portion which faces the heating elements 18. However, convection air currents and the vapors from the bread slice itself can pass readily to the thermally responsive ribbon 60. In addition, that portion of the tubular member facing the side of the bread slice B can have relatively large openings, in order that the radiation from the toast can effect the required increase in the temperature of the thermally responsive element 60 over and above the temperature caused by the air and vapors in the toaster, for the purpose of enabling the spring 74 to depress the rod 70 to an extent sufficient to close the circuit through the microswitch 33, thus securing the tripping of the toaster and the opening of the circuit to the heating elements 18.

In the form of invention disclosed in Figs. 11 and 12, a thermally responsive device is disclosed that is adapted to be placed between the bread slice B and the heating element 18. Such device can take the place of the bread wires 17 and will be disposed contiguous the slice of bread B, so as to contact the same. Thus, the toaster will have the assemblage disclosed in Fig. 11 disposed on one side of the slice of bread B located within the toaster.

The device includes a plurality of heat absorbent wires, 90, 91, 92, 93, preferably having a relatively high coefficient of expansion and contraction, supported between the upper and lower members 94, 95 of a frame 96. Thus, generally parallel spaced apart wires 90—93 are embodied in the mechanism, in order to provide a large degree of cumulative movement, for the purpose of actuating the microswitch 33. One of the wires 93, such as an end wire, extends through the lower frame 95 member and is secured to a plunger 97 extending outwardly through a housing 98 in alignment with the microswitch button 48. A helical compression spring 99 encircles this wire, with one end bearing against the upper end of the plunger 97 and its other end against the lower frame member 95, the spring preferably being enclosed within the tubular housing 98.

The heat responsive wire 93 extends upwardly toward the upper frame member 94, where it is attached to one end of a rocker arm 100 fulcrumed upon a hinge pin 101 suitably secured to the upper frame 94. The other end of the rocker arm 100 has a second thermally responsive wire 9a attached to it, which extends downwardly toward the lower frame member 95, where it is secured to one end of a lower rocker arm 102 pivotally mounted upon a hinge pin 103 suitably secured to the lower frame 95. The other end of this lower rocker arm 102 is secured to a third thermally responsive wire 91 that extends upwardly toward a second upper rocker arm 104, to one end of which it is secured. This rocker arm is likewise suitably pivotally mounted upon a hinge pin 105 secured to the upper frame member 94 and has a thermally responsive wire 90 attached to its other end that extends downwardly toward the lower frame member 95, to which it is suitably secured.

The spring 99 keeps all of the wires 90—93 in a tight or taut condition. As the temperature of the wires increases, they tend to expand and increase in length, allowing the spring 99 to expand and move the plunger 97 downwardly toward the switch button 48. When the temperature of the wires increases sufficiently, the plunger 97 will actuate the switch button 48, to close the micro-switch 33 and secure the tripping of the apparatus, in the same manner as was described above in connection with the form of invention shown in Fig. 1.

The parallel wire arrangement illustrated in Fig. 11 is exposed directly to the radiant heat emanating from the heating elements 18 on one side of the slice of bread B. However, such heat is insufficient to create a sufficient rise in the temperature of the generally parallel wires 90—93, as to enable the plunger 97 to be depressed sufficiently to close the microswitch 33 and secure the tripping of the toaster mechanism to an open circuit condition. It takes the additional heat in the bread slice B itself, when it reaches the desired toasted condition, to be imparted to the wires 90—93 and increase their temperature to a sufficient degree above the temperature that the heating elements themselves can heat the wires to secure the closing of the microswitch 33 and of the entire toaster mechanism.

Following the interruption of the circuit through the heating elements 18, the entire apparatus can cool, the wires 90—93 cooling rather quickly, in order to cause them to contract and pull the plunger 97 away from the microswitch 33, causing the circuit through the solenoid coil 30 to be in an open condition and ready for the commencement of the next cycle of operation of the toaster.

In all forms of the invention, the heat responsive control elements are relatively thin, in order to absorb heat throughout their entire mass very quickly and expand, and also to lose heat very quickly when the toasting cycle has been completed through opening of the circuit through the heating elements 18. Accordingly, upon removal of a slice of toast from the toaster, and the immediate insertion of another slice of bread in the toaster, the thermally responsive elements have cooled sufficiently so that they cannot be inadvertently and prematurely heated to a sufficiently high temperature as to trip the apparatus prior to toasting of the bread, or other food product, in the toaster to the desired toasting condition. Again, it is pointed out that the heat to which each thermally responsive element is subjected by the heating element 18 itself is insufficient to raise its temperature to the degree necessary to close the microswitch 33. It takes the additional heat from the toasted bread itself, when it has secured the desired color, to give the thermally responsive elements a boost in their temperature, which occurs rather rapidly as the bread turns brown, to effect a closing of the microswitch and the tripping of the toaster mechanism.

The inventor claims:

1. In a bread toaster: an electric circuit including a generally vertically arranged electric resistance planar heating element; a support for holding a slice of bread in spaced and generally parallel relation to said element and adjacent thereto; a switch for controlling said circuit; means for effective opening of said switch when the bread slice has been toasted to a selected condition, comprising a generally horizontally disposed thermally responsive element extending along the bread slice throughout the entire length of the bread slice and located above said heating element adjacent the upper edge of a bread slice of normal size in a plane between said resistance element and bread slice and facing and subject to the heat emanating from the bread slice throughout the length of the bread slice; and insulating means between said thermally responsive means and resistance element shielding said thermally responsive means throughout its length from radiant heat emanating from said resistance element; the lower portion of said insulating means being spaced from the bread slice a sufficient distance to allow hot air and vapors to rise in the toaster and contact said thermally responsive element.

2. In a bread toaster as defined in claim 1, wherein said means for effecting opening of said switch also comprises a trip mechanism and means for actuating said trip mechanism.

3. In a bread toaster as defined in claim 1, wherein said thermally responsive means comprises a helical metallic member.

4. In a bread toaster as defined in claim 1, wherein said thermally responsive means comprises a metallic ribbon.

5. In a bread toaster as defined in claim 1, wherein said thermally responsive means comprises a helical metallic member and said means for effecting opening of said switch includes means for transmitting the rotary motion of said helical metallic member caused by change in its temperature to said switch to operate the same.

6. In a bread toaster as defined in claim 1, wherein said thermally responsive means comprises a metallic ribbon and said means for effecting opening of said switch includes means for transmitting the motion of said ribbon caused by change in its temperature to said switch to operate the same.

7. In a bread toaster: an electric circuit including an electric resistance heating element; a support for holding a slice of bread in spaced and generally parallel relation to said element and adjacent thereto; a switch for controlling said circuit; means for effecting opening of said switch when the bread slice has been toasted to a selected condition, comprising a trip mechanism, means for actuating said trip mechanism, a thermally responsive helical metallic member extending in a generally horizontal direction lengthwise of and generally parallel to the heating element at the upper end of a bread slice and located in a plane between said resistance element and bread slice and facing and subject to the heat emanating from the bread slice, and means for transmitting the rotary motion of said helical member produced by change in its temperature to said actuating means; and insulating means between said thermally responsive element and resistance element shielding said thermally responsive element from radiant heat emanating from said resistance element.

8. In a bread toaster: an electric circuit including a generally vertically arranged electric resistance heating element; a support for holding a slice of bread in spaced and generally parallel relation to said element and adjacent thereto; a switch for controlling said circuit; means for effecting opening of said switch when the bread slice has been toasted to a selected condition, comprising a trip mechanism, means for actuating said trip mechanism, a generally horizontally disposed thermally responsive helical metallic member located at the upper end of a bread slice in a plane generally parallel to the heating element and between said resistance element and bread slice and facing and subject to the heat emanating from the bread slice, means for transmitting the rotary motion of said helical member produced by change in its temperature to said actuating means, and means between said thermally responsive member and resistance element shielding said thermally responsive member from radiant heat emanating from said resistance element, the lower portion of said shielding means being spaced from the bread slice to allow hot air and vapor to rise in the toaster and contact said thermally responsive member.

References Cited in the file of this patent

UNITED STATES PATENTS

| | | |
|---|---|---|
| 2,120,289 | McCullough | June 14, 1938 |
| 2,264,611 | Bemis | Dec. 2, 1941 |
| 2,275,265 | Mead | Mar. 3, 1942 |
| 2,409,414 | Bletz | Oct. 15, 1946 |
| 2,459,169 | Koci | Jan. 18, 1949 |
| 2,615,386 | Palmer | Oct. 28, 1952 |
| 2,655,860 | Smith | Oct. 20, 1953 |
| 2,667,115 | Vogelsberg | Jan. 26, 1954 |
| 2,692,549 | Olson et al. | Oct. 26, 1954 |
| 2,750,873 | Sivacek | June 19, 1956 |